(No Model.)  
6 Sheets—Sheet 1.

D. E. POWERS.
Tube Machine.

No. 240,541. Patented April 26, 1881.

Witnesses  
A. H. Krause  
F. G. Dieterich

Inventor  
Daniel E. Powers (No Model.)

D. E. POWERS.
Tube Machine.

No. 240,541.    Patented April 26, 1881.

Fig. 2.

(No Model.) 6 Sheets—Sheet 3.

D. E. POWERS.
Tube Machine.

No. 240,541. Patented April 26, 1881.

Witnesses.
A. H. C. Krause
F. G. Dieterich

Inventor
Daniel E. Powers

(No Model.)

D. E. POWERS.
Tube Machine.

Patented April 26, 1881.

Fig. 10.

Side Elevation of Fig. 10.

Witnesses.
A. H. Krause
F. G. Dieterich

Inventor
Daniel E. Powers

N. PETERS, PHOTO-LITHOGRAPHER, WASHINGTON, D. C.

UNITED STATES PATENT OFFICE.

DANIEL E. POWERS, OF NEW YORK, ASSIGNOR TO STEPHEN W. WOOD, OF CORNWALL, N. Y.

TUBE-MACHINE.

SPECIFICATION forming part of Letters Patent No. 240,541, dated April 26, 1881.

Application filed February 28, 1881. (No model.)

*To all whom it may concern:*

Be it known that I, DANIEL E. POWERS, of the city, county, and State of New York, have invented new and useful Improvements in Machines for Rolling Paper Tubes; and I do hereby declare that the following is a full, clear, and exact description thereof, reference being had to the accompanying drawings, making part of this specification.

My invention relates to rolling paper tubes; and it consists substantially of the mechanism herein set forth.

Like letters indicate corresponding parts in all of the figures.

Figures 1, 15, 16, 17:
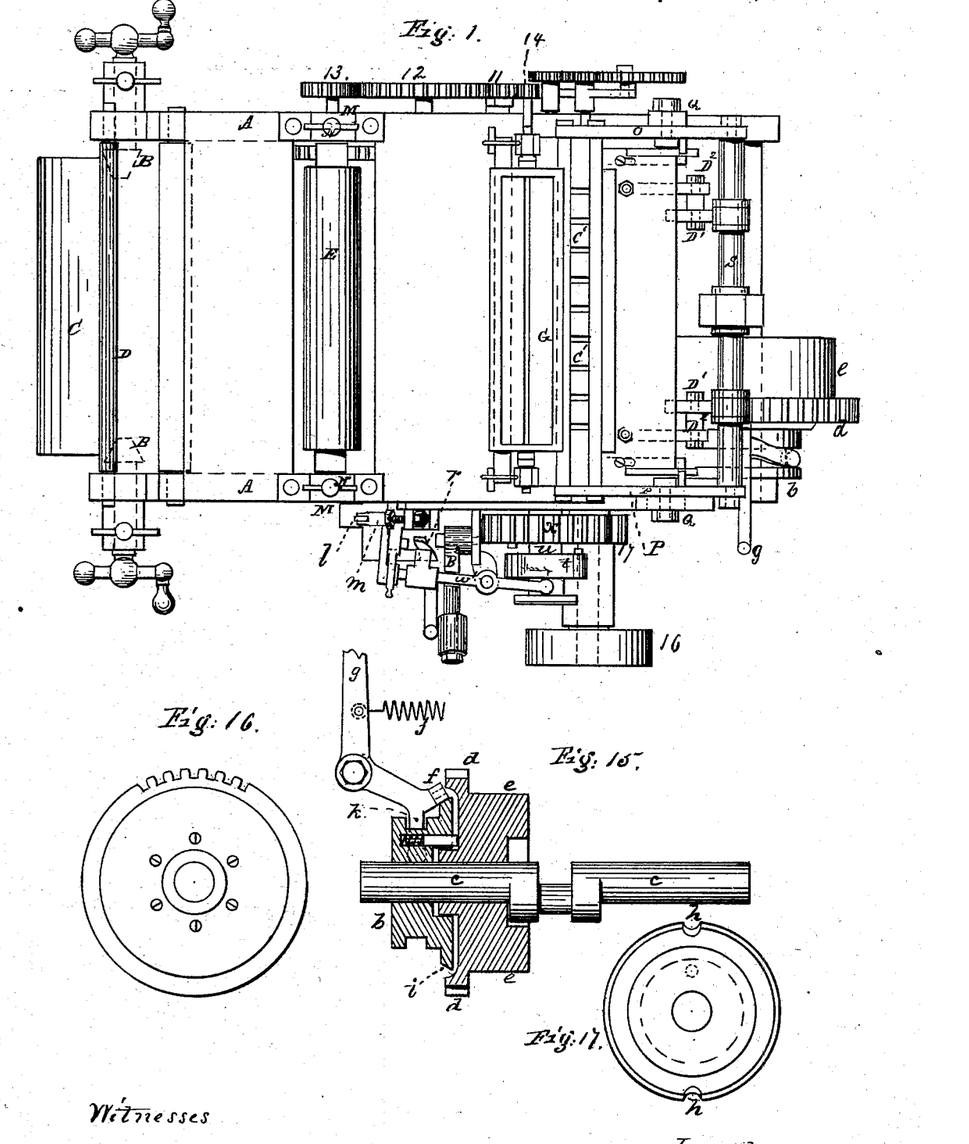
Figure 1 is a plan of machine for rolling paper tubes complete.
Fig. 15, section of a loose cog-wheel and sliding clutch on the shaft c, the cog-wheel rotating constantly, but the clutch making only a half-revolution when engaged with the cog-wheel to raise and lower the adjustable upper spring-roller to admit the mandrel on which to roll a tube and to remove the same after a tube shall have been rolled thereon.
Fig. 16, face view of the cog-wheel with which the clutch engages to raise and lower the adjustable spring roller.
Fig. 17, detached view of the face of the sliding clutch, showing two notches thereon directly opposite each other, into which the friction-roller on the handle by which it is operated drops alternately, to disengage the clutch at each half-revolution to stop the crank on the same shaft therewith at each half-revolution, to raise and lower the adjustable spring-roller, as the case may be.
Figure 2:
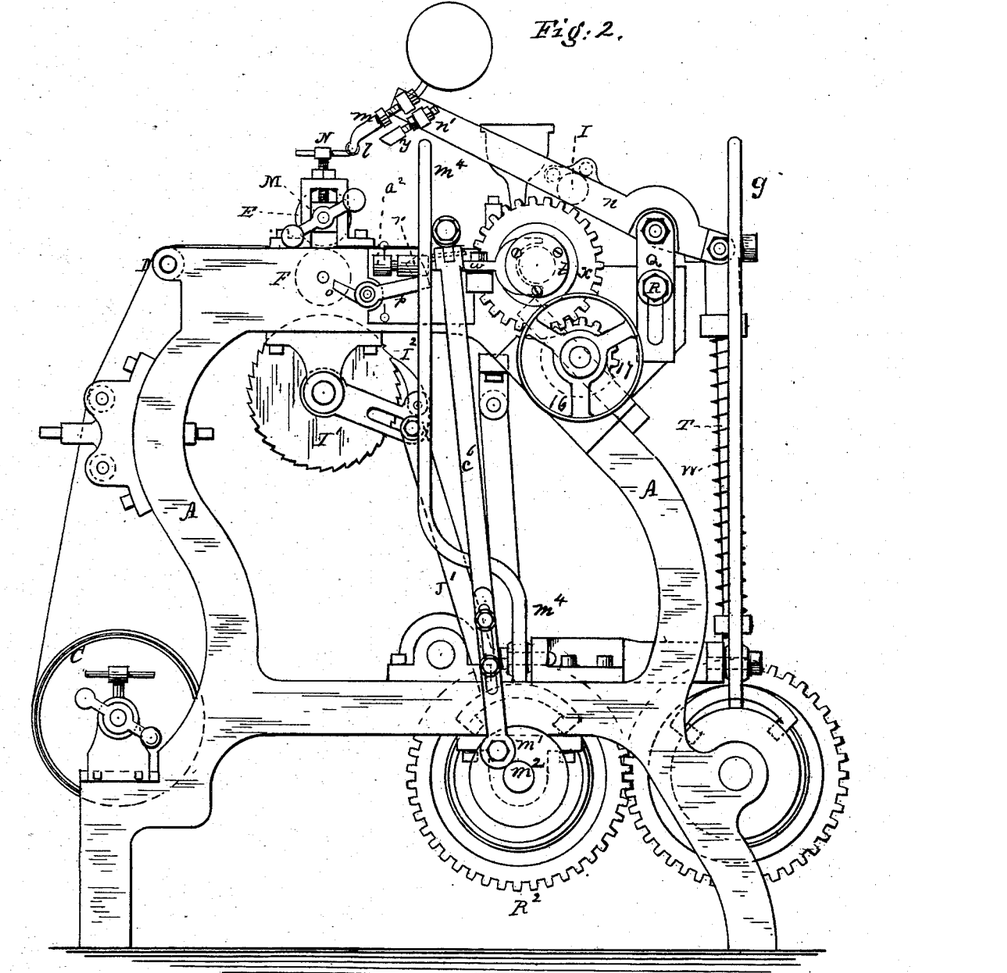
Fig. 2, side elevation thereof.

A in the accompanying drawings represents a frame, upon which the operating mechanism to roll paper tubes is mounted. To the rear end of this frame, Figs. 1, 2, are arranged two cones, B B, between and upon which the roll of supply paper C is placed and revolves, and by which cones sufficient friction is obtained to hold this supply-roll firmly and steadily while a tube is being rolled. The end of the web from this supply-roll is then passed upward and over a friction-roller, D, at the top of the rear end of the frame, and thence forward upon the table and between two flexible or rubber rollers, E F, and thence forward, beneath the paste-box G and paste-roller H to the system of rollers I J K, between which rollers the mandrel L is placed upon the end of the web in readiness to commence to roll a tube, as in detached view, Fig. 5. These flexible rollers E F are adjustable, by means of sliding journal-boxes M, to the uppermost one, E, so that the required pressure may be obtained, by means of thumb-screws N N, to move the web forward to present the end thereof between the rollers to receive the mandrel, Fig. 3.

The rollers J K, upon which the mandrel L is laid, are supported by suitable journal-boxes, and are parallel to each other.

The third roller, I, is mounted in journal-boxes on two vibrating arms, O P, so that it may be raised and lowered thereby and rendered yielding and self-adjusting. This roller is raised, as in Figs. 2, 3, to permit the mandrel L to be introduced and laid upon the end of the web of paper, and to descend and rest upon the mandrel in rolling a tube thereon. To raise and lower this roller I the vibrating arms O P, upon which it is mounted and revolves, are pivoted to sliding boxes Q Q, secured to the frame A at R, and their opposite ends are united by a cross-bar, S. To this cross-bar S is fitted a spring connecting-rod, T, which is also connected at its opposite end to a crank, U, on the shaft V of the cog-wheel directly beneath, and hereinafter described, and by which connecting-rod T and crank U it is operated to raise and lower the roller I. To obtain the elasticity required in this connecting-rod T a spring, W, is provided, which is confined between a nut, X, at the lower end of the elongated journal-box Y and set-nut at the bottom thereof. The upper end of this connecting-rod T enters into a recess, Z, formed in the lower end of the elongated journal-box Y, and is retained therein by a head, $a$, resting on the inside of the nut X, (detached view, Fig. 18,) so that when the roller I descends upon the mandrel L to roll a tube therein it may yield, by the head $a$ of the spring connecting-rod T sliding up and down in the recess Z to adjust itself in rolling a tube.

Figures 3, 18:
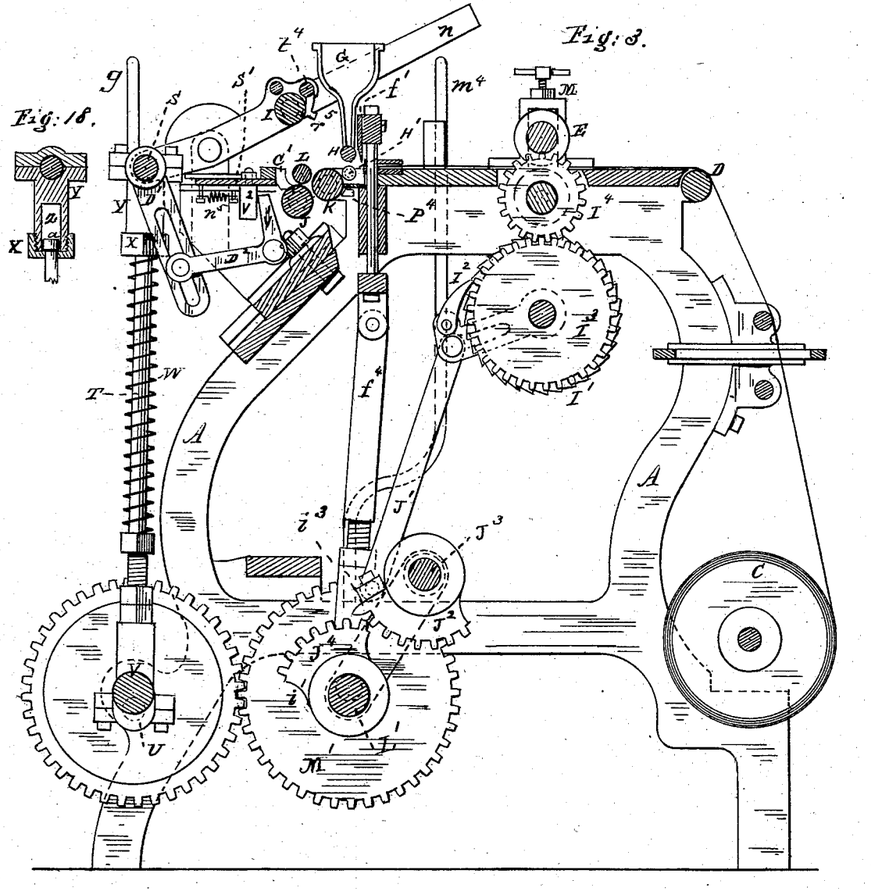
Fig. 3, vertical longitudinal section thereof in position to receive a mandrel upon which to roll a tube.
Fig. 18, detached view of the elongated journal-box, in which the end of the connecting-rod for raising and lowering the adjustable spring-roller slides, to render this spring-roller self-adjusting on the mandrel in rolling a tube.
Figure 4:
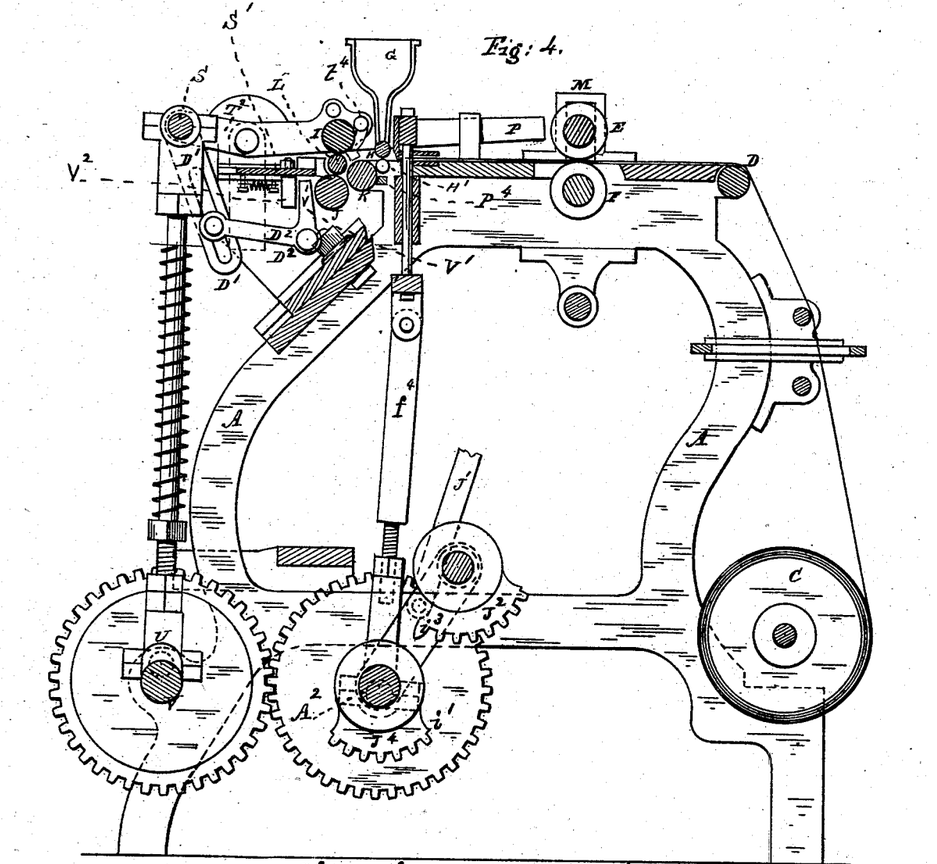
Fig. 4, similar vertical longitudinal section with mandrel therein and the several parts closed and in position to roll a tube.

To raise the arms O P and spring-roller I secured thereto, to insert a mandrel, L, upon the fixed rollers J K, and upon the end of the web, in position to commence to roll a tube, the crank U on the shaft V, to which the connecting-rod T is attached, makes a half-revolution, as in Fig. 3, and to lower the roller I upon the mandrel L, to inclose it between the three rollers I J K, to roll a tube, the crank U makes another half-revolution and returns to the point of starting, as in Fig. 4. The mechanism to operate this crank U intermittently to raise and lower the roller I consists of a sliding clutch, $b$, on the shaft $c$, which engages with a corresponding clutch on the face of the cog-wheel $d$ on the same shaft. This cog-wheel $d$ is driven by a belt on its flat surface $e$, and revolves constantly, so that when the clutches are engaged the crank U makes at any moment a half-revolution by means of the friction-roller $f$, operated by a handle, $g$, moving out of one of the notches $h$, and riding on the beveled edge $i$, to the next notch, into which it falls, Fig. 17. This holds the clutches together during the time that the friction-wheel is rolling upon the beveled edge, and when the crank U has made its half-revolution, either to raise or lower the roller I, as the case may be, the friction-roller $f$ enters one of the notches $h$ by means of the spring $j$, thereby disconnecting the clutch $b$, which is drawn away by the lower end, $k$, of the handle $g$, thus stopping the crank at its half-revolution.

Figure 10:
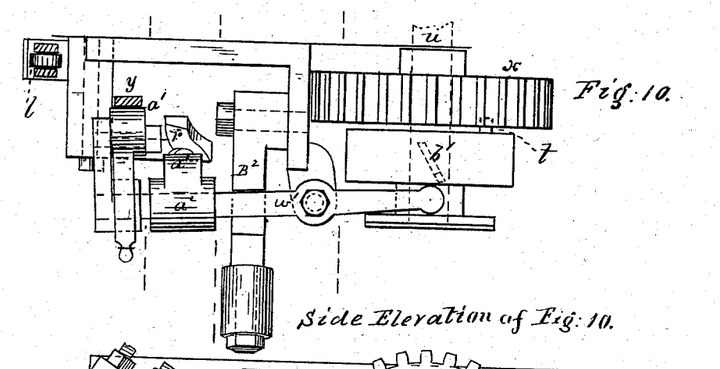
Fig. 10, plan of detached view of the self-adjusting mechanism in position and in readiness to commence to roll a tube.
Figure 11:
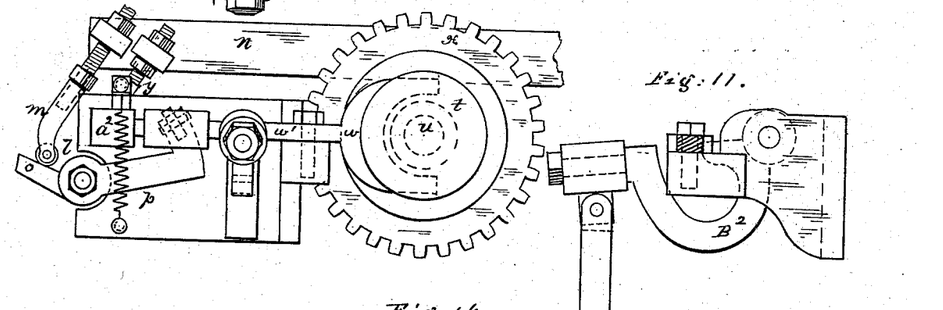
Fig. 11, detached side view of a section of a connecting-rod and cam for operating the system of rollers to revolve the mandrel after the tube shall have been nearly rolled thereon to the required thickness, and to finish rolling the tube and paste the remaining edge of the paper down thereon.
Figure 12:
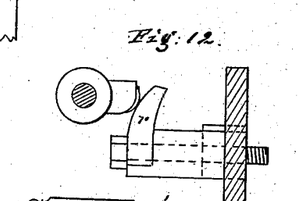
Fig. 12, detached view of a cam and friction-roller to connect the clutch on the driving-wheel to start the machine to roll a tube.
Figure 13:
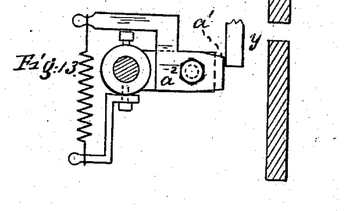
Fig. 13, detached view of a latch for holding the clutch in connection to revolve the rollers until the tube shall have been rolled to the required given thickness.

In lowering the roller I to inclose the mandrel L between the three rollers I J K to roll a tube thereon, the friction-roller $l$ on the end of an adjustable stem, $m$, secured to and projecting downward from an arm, $n$, bolted firmly to and moving with the arm P, strikes the end $o$ of the bell-crank $p$, on the opposite end of which is a cam, $r$, thereby uniting the clutch $t$ on the shaft $u$ of the roller K, through the forked lever $w$, to the cog-wheel $x$, at the same time permitting the end of the adjustable stem $y$, secured to the same arm, to press down and pass by the end $a'$ of the latch $a^2$, mounted on the end of the forked lever $w$, thereby holding the clutch $t$ firmly engaged with the cog-wheel $x$, Fig. 10, and as the tube increases in thickness on the mandrel and thereby raises the roller $l$ off the end of the bell-crank, the stem $y$ rises also, being secured to the same arm $n$, and passes above the end $a'$ of the latch $a^2$, releases the clutch $t$ from the cog-wheel $x$, and permits the rollers I J K to stop; and while a tube is being rolled the friction-roller $l$ on the stem $m$ rises off the end $o$ of the bell-crank $p$ and permits the cam $r$ on its opposite end to drop down in position to be again raised by the descent of the friction-wheel $l$ upon it, to operate the forked lever $w$ to engage the clutch $t$ with the cog-wheel $x$, to roll the next succeeding tube.

To facilitate the prompt disengaging of the clutch $t$ from the cog-wheel $x$ a spiral feather, $b'$, is secured to the extended end of the roller K, and upon which the cog-wheel $x$ and clutch $t$ are mounted and operate.

Figure 14:
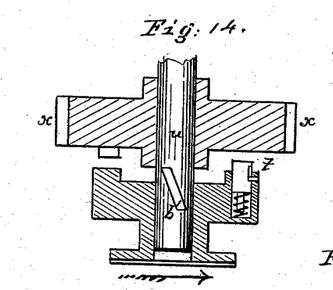
Fig. 14, section of a loose cog-wheel and sliding clutch on the shaft of one of the rollers, between which the mandrel is placed, the cog-wheel revolving constantly, but the clutch revolving only when engaged with the cog-wheel and when a tube is being rolled, and to stop the web by disengaging with the cog-wheel when the tube shall have been rolled to the required given thickness.

The clutch $t$ revolving in the direction indicated by the arrow, Figs. 14, 1, the spiral feather $b'$ is curved in the same direction, so that the clutch $t$ is held engaged with the cog-wheel $x$ when rolling a tube, by the end only of the latch $a'$ bearing against the side of the stem $y$, so that when the side of the stem is raised above the upper edge of latch $a'$, when the tube shall have been rolled to the required given thickness, the clutch $t$ instantly disengages itself by its own weight and momentum from the cog-wheel $x$, the spiral feather $b'$ causing the clutch to move faster than the cog-wheel with which it is engaged.

The adjustable roller I, secured to the arms O P, rests directly upon the mandrel L in rolling a tube, so that as the paper is wound tightly around this mandrel the roller rises with the increasing thickness thereon, and raises the arms O P therewith, and the stem $y$, secured to the end $n'$ of the arm $n$, so that when the tube being rolled shall have acquired the exact thickness desired the mechanism will disengage, and the roller I, together with the mandrel and tube thereon, stop, the thickness of the tube on the mandrel governing the stopping of this mechanism, by which construction and operation tubes may be rolled always of a given uniform thickness notwithstanding the web from the supply-roll may vary in thickness. If the web from the supply-roll be thin, then a longer piece would be required to roll a tube of a given thickness, and if the web varies and becomes thicker, then the mechanism just described will compensate for the variation in thickness of the web, and only allow the mandrel to receive sufficient to roll the tubes always of a uniform given thickness.

Figures 5, 6:
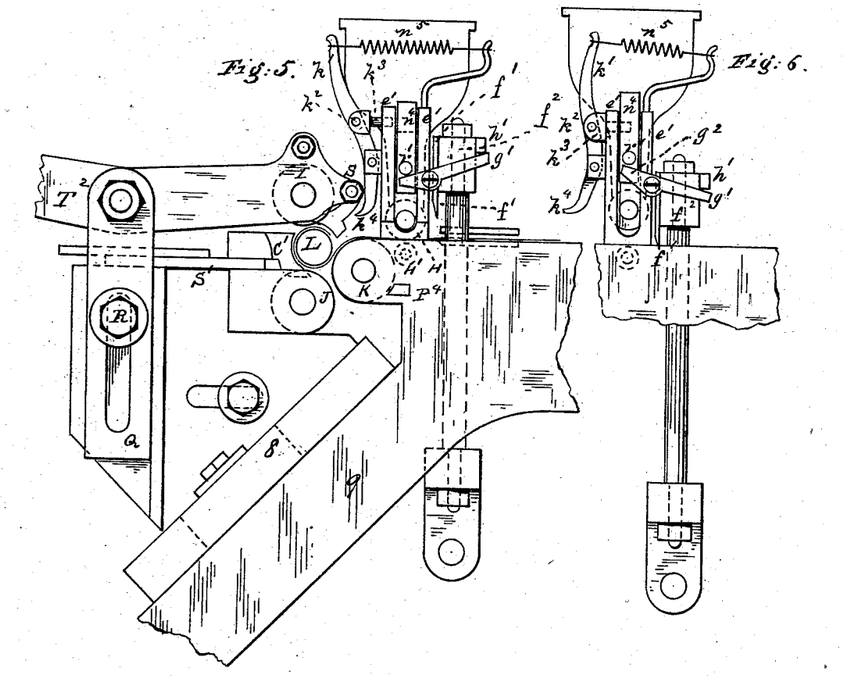
Fig. 5, side elevation of detached view of the rolling mechanism, paste-box, knife, rolling-mandrel, and end of web partly surrounding the same, all in proper position to commence to roll a tube, also showing the mechanism by which the paste-box and paste-roller secured thereto are raised and lowered.
Fig. 6, similar detached view, showing the paste-box with its paste-roller raised off the paper and the knife in position after having severed the paper forming the tube from the web of the supply-roll.

To paste the web of paper as it is being rolled into a tube, a paste-box, G, with a paste-roller, H, to spread the paste evenly upon the surface of the web, is provided, which is suspended and moves up and down in ways $e'$, secured to the frame A, Figs. 5, 6, and is located directly in front of the knife $f'$, and as near to the rollers I J K as convenient.

In order that the end of the web of paper may be passed to the rollers I J K, so that the mandrel L may be placed thereon preparatory to rolling a tube, the paste-box G, with its paste-roller H, is raised, as represented in Figs. 3, 6, by means of latches $g'$, hinged to the ways $e'$, and operated to raise the paste-box by projections $h'$, extending from the ends of the knife-bar $f^2$, so that when the knife $f'$ descends to sever the web from the piece forming the tube the ends of the latches $g'$, depressed by the projections, raise the opposite ends $g^2$, which, bearing against studs $r'$, extending from the ends of the paste-box G, raise the paste-roller off the web, to permit the severed end thereof to pass beneath it to receive the mandrel to roll the next succeeding tube.

To hold the paste-box and roller off the web while its end is being carried forward to receive the mandrel, as in Fig. 6, and to lower them so that the paste-roller may rest upon the web to paste the paper for a tube as it is being drawn beneath it, spring-bars $k'$ are pivoted to the ways at $k^2$, and are provided with sliding bolts $k^3$, so that when the paste-box shall have been raised to the required height the ends of the bolts $k^3$ enter corresponding recesses in the slide $n^4$ and retain the paste box and roller in their raised position, as represented in Fig. 6. To operate these hinged bars $k'$, to lock the paste-box in its raised position, springs $n^5$ are attached to the upper ends thereof, which throw the lock-bolts forward whenever the recesses in the slides are presented to receive them.

When the knife rises and the paste-roller is off the web the severed end of the web is fed forward beneath the knife and paste-roller, so as to present sufficient of the end thereof, without paste thereon, to make the first, or nearly the first, turn of paper around the mandrel in rolling a tube.

To release the paste-box and permit it to descend by its own gravity, so that the paste-roller may rest upon the web to paste it as a tube is being rolled, the lower ends, $k^4$, of the hinged lock-bars $k'$ are curved and form cams, against which the cross-bar $t^4$, secured to the ends of the arms O P operates, and vibrates the hinged bars to withdraw the lock-bolts $k^3$ from the recesses in the slides $n^4$ of the paste-box G, which move up and down in the ways $e'$, as in Figs. 5, 6.

In order to hold the web of paper up against the paste-roller H, so that the paste may be spread evenly thereon in rolling a tube, a flexible roller, H', is placed directly beneath, and upon which the paste-roller rests in pasting the web to roll a tube as it is being drawn between them.

To operate the knife to sever the web from the piece of paper which has been nearly wound around the mandrel in rolling a tube, to raise the paste-box and the paste-roller secured thereto off the end of the piece of paper to complete the tube, and to move the end of the web forward to receive the mandrel to roll the next succeeding tube, a ratchet-wheel, I', and pawl I² are provided, the ratchet being mounted upon and secured to the shaft of the cog-wheel I³, which cog-wheel I³ takes into a smaller wheel, I⁴, secured to the outer end of the shaft of the lowermost rubber roller, F.

To the shaft of the cog-wheel I³ is fitted an adjustable slotted link, Figs. 2, 3, which is coupled to the end of the connecting-rod J', and to which the pawl I² is also pivoted. This slotted and adjustable link serves to regulate the movement of the pawl I² in turning the ratchet-wheel to revolve the rubber rollers E F, and to move the pawl in the arc of the circle of the ratchet-wheel I'. The opposite end of this connecting-rod J' is pivoted to the segment J² of a cog-wheel, secured to the rock-shaft J³, which segment takes into a corresponding segment, J⁴, on the shaft L' of the cog-wheel M'. To obtain the required intermittent movement of the mechanism operated thereby the segment J⁴, from its lowermost position, Fig. 4, is revolved a half-revolution, and the edge $i'$ of this segment, striking against an elongated tooth, $i^3$, on the segment J², directs the cogs of both segments into gear, thereby revolving the segment J² a quarter-revolution, raising the connecting-rod J' and pawl I², and revolving the flexible rollers E F, between which the web from the supply-roll is carried forward to the mandrel for the next succeeding tube.

When sufficient paper to form a tube shall have been wound around the mandrel, and the rollers I J K and mandrel stopped, as hereinbefore described, the knife $f'$ descends to sever the web, carrying with it, through the connecting-rod $f^4$, the segment $J^4$ of a cog-wheel a half-revolution, as in Fig. 4, and there remains until again revolved to move its corresponding segment $J^2$ a quarter-revolution, as in Fig. 3.

When the segment $J^4$ shall have made its half-revolution and become disengaged from the segment $J^2$, it drops back of its own gravity and the weight of the connecting-rod J', to be in position to make the next quarter-revolution, to revolve the flexible rollers E F, and to feed forward the web in position to receive the mandrel thereon for the next succeeding tube. In this position it will be observed that before the edge $i'$ of the segment $J^4$ reaches the elongated cog-tooth $i^3$ on its corresponding segment $J^2$, the connecting-rod $f^4$, secured to the same shaft by a crank, will have raised the knife $f'$ sufficiently, before the flexible rollers commence to revolve, to permit the web to pass beneath it, so that the end thereof may be presented to the mandrel for the next succeeding tube.

To operate these segmental cog-wheels $J^2$ $J^4$, flexible rollers E F, and knife $f'$ intermittently and in unison, as required to move the web forward and sever it from the piece to form the tube, a cam, $m'$, is mounted upon the shaft $m^2$ of the cog-wheel $R^2$, with which it engages to operate these segments by means of a handle, $m^4$, and friction-wheel $f$, constructed and operating the same as that described and represented in Figs. 15, 16, 17, to operate the mechanism to raise and lower the arms O P, upon which arms the adjustable spring roller I is mounted and revolves.

When sufficient paper shall have been wound around the mandrel to nearly form a tube of any required thickness, the mechanism, governed and operated by the thickness of paper on the mandrel, stops the web, which is then severed by the knife, and at the same time the paste-box and roller are raised therefrom.

To operate the knife $f'$ to sever the web from the piece which has been nearly wound around the mandrel to form a tube, to raise the paste-box G and paste-roller H off the end of the piece of paper, so as to complete the tube, the crank-shaft L' makes a half-revolution, thereby allowing the segmental cog-wheels to assume the position as in Fig. 4.

While the crank $A^2$ is making its half-revolution to sever the web and raise the paste-roller, the connecting-rod $c^6$, pivoted to the cam $m'$, draws down the U-shaped cam $B^2$, which, acting against the arm $w'$ of the forked lever, engages the clutch $t$ again to the cog-wheel $x$, to revolve the rollers I J K and complete the tube, sufficient paste having been left on the web when the paste-roller is raised therefrom to cover the surface of the remaining end, between the knife and rollers, and to paste the edge down upon the tube.

To direct the end of the web around the mandrel in commencing to roll a tube, a series of self-adjusting guide-fingers, C', are provided, which are admitted into corresponding grooves $C^2$, to receive them formed in the roller J, (detached view, Fig. 9,) in order that they may nearly touch the mandrel upon which the tube is to be rolled. That these guide-fingers C' shall recede from the mandrel as the paper thereon increases in thickness in rolling a tube, slotted connecting-bars D' are placed on the cross-bar S and pivoted to bell-cranks $D^2$, and which bell-cranks are pivoted to the inside of the frame A. The short ends V' of these bell-cranks bear against lugs $V^2$, projecting downward from a sliding plate, S', to which these guide-fingers C' are bolted, so that as the roller I is raised by the increasing thickness of the paper on the mandrel in rolling a tube, the opposite ends, $T^2$, of the hinged arms O P are depressed, carrying downward therewith the slotted connecting-bars, pivoted to the long arms of the bell-cranks $D^2$, and as the tube being rolled continues to increase in thickness on the mandrel, the short arms V' of the bell-cranks $D^2$ bear against lugs $V^2$, projecting downward from the plate S', move the fingers C', secured to this plate, away and permit the tube to be finished without touching these fingers, as in Fig. 3; and when the adjustable roller is raised to remove the mandrel and finished tube thereon the guide-fingers are forced still farther back, and so remain at a distance from the mandrel, Fig. 3, until the adjustable roller is lowered, as in Figs. 5, 4, when the fingers are again drawn forward in position to partly surround the mandrel, by springs $n^5$.

Similar guide-fingers, $r^5$, are secured to a cross-bar, $t^4$, on the end of the arms O P, which continue to direct the end of the web between the rollers and around the mandrel after having left the guide-fingers C', as represented in Figs. 4, 3. The adjustable spring-roller I is grooved to receive them the same as the lower roller to receive the sliding fingers, in detached view, Fig. 9.

Figure 9:
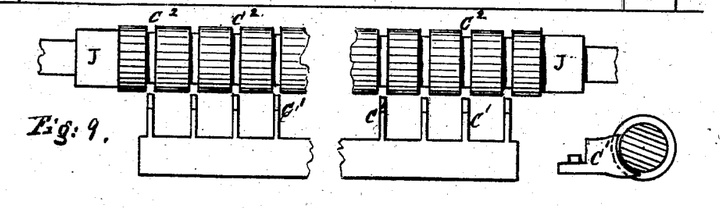
Fig. 9, detached view of one of the system of rollers, between which the mandrel is placed to roll a tube, and the self-adjusting fingers for directing and holding the end of the web around the mandrel to commence to roll a tube.

The rollers I J are preferably fluted, as represented in Fig. 9, so as to revolve the mandrel with more certainty in rolling a tube, and to prevent its slipping between the rollers when the web is held back by a strong tension.

To remove the surplus paste which gathers on the smooth roller K, a spring-scraper, $P^4$, is arranged so as to constantly press against the smooth surface of this roller, thereby scraping off the paste, and keeping it clean of paste, and allowing a tube to be rolled without adhering thereto.

Figures 7, 8:
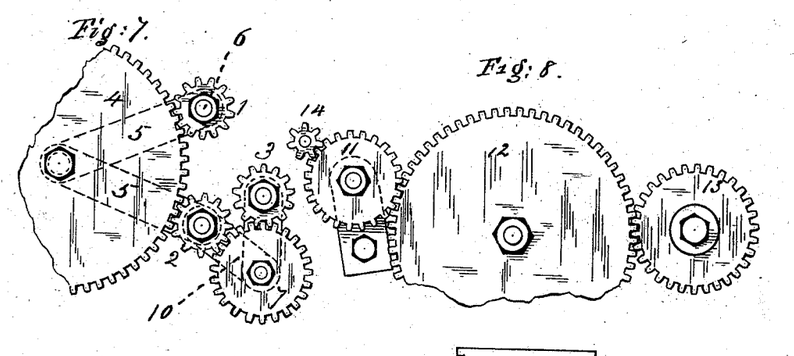
Fig. 7, side elevation of the system of adjustable cog-wheels for revolving the rollers, between which the mandrel is placed to roll a tube detached.
Fig. 8, side elevation of the system of cog-wheels for intermittently moving the web from the supply-roll forward between the rollers to receive the mandrel thereon to commence to roll a tube and to revolve the paste-roller.

To obtain positive rotating movements to the rollers I J K, between which the tubes are rolled, a system of adjustable cog-wheels is arranged, as represented more clearly in detached Fig. 7. To the ends of the rollers I J K are secured pinions 1 2 3, of equal diameters and equal number of cogs, in order that the rollers shall rotate with equal velocity to revolve the mandrel placed between them; and that the pinions 1 2 3 shall always remain in gear and revolve in the required direction independent of the constantly-varying diameter of the tube being rolled, an intermediate cog-wheel, 4, is hung on adjustable bars 5, so that as the diameter of the tube increases, or the roller raised to remove the mandrel with a tube thereon, and replaced by another one, as in Fig. 3, the pinion 1, pivoted to one end, 6, of the adjustable bars 5, is raised therewith and follows, still in gear, in the arc of the circle, with the periphery of the intermediate cog-wheel, 4.

Power being applied to the roller K the pinion 3 thereon revolves the intermediate wheel, 7, which intermediate wheel revolves the pinion 2 on the end of the roller J, and which pinion 2 revolves the intermediate wheel, 4, hung on the adjustable bars 5, and which, in its turn, revolves the pinion 1, on the end of the adjustable roller I, thus obtaining the required movement to the entire system to rotate in unison and in the required direction to revolve the mandrel L.

To roll tubes of different diameters a sliding head, 8, is bolted to the inclined surface of the frame at 9, Fig. 5, and to which sliding head the adjustable roller J is secured in suitable boxes, the adjustable bars 10 retaining the pinion 2, on the end thereof, always in gear with the intermediate wheel, 7.

To adjust the rollers I J K so as to roll tubes of greater diameter than that for which they are arranged in the accompanying drawings, the sliding head 8 is moved downward, so as to open the adjustable bars 10, upon which the intermediate wheel, 7, is hung, to permit the roller J to move farther away from the fixed roller K; and to set the adjustable roller I so as to properly rest upon the larger mandrel, the adjustable boxes Q, secured to the frame, are raised, thus changing the arc of the circle in which the roller I on the ends of the arms O P moves. By these adjustable bars 10 and adjustable head 8 the location of these rollers may be changed, but the same relative positions maintained in order to roll tubes of many different diameters without changing or disturbing the system of cog-wheels by which they are revolved.

To diminish or increase the thickness of the tubes being rolled, the adjustable stem $y$, against which the latch $a'$ rests, is raised or lowered, as the case may be, and is held in position by jam-nuts.

Having described the mechanism in detail for producing the required movements to roll and finish tubes consecutively, one after another, from an endless web of paper, it is proper to repeat the various operations briefly and how they are effected.

From the supply-roll the web is passed up and over a roller, D, at the rear end of the frame A, thence forward through flexible rollers E F, and thence to the system of rollers I J K, to receive the mandrel on the end thereof, and upon which end, for nearly or quite the first turn, there is no paste. The mandrel having been introduced, the adjustable roller I is lowered thereon by the clutch $b$, operated by the handle $g$. In the downward movement of the adjustable roller the guide-fingers $C'$ move forward to start and guide the end of the web around the mandrel, and the upper guide-fingers, $r^5$, in front of the roller I, assume their position to continue to guide the end of the web around the mandrel, and the paste-box G is lowered, so that the paste-roller H rests upon the web to spread the paste thereon evenly, and the clutch $t$, engaged with the cog-wheel $x$, by means of the mechanism described for the purpose, the rollers are set in motion, and sufficient of the web wound around the mandrel to nearly form a tube of any given thickness, at which stage the clutch $t$ is automatically disengaged from the cog-wheel $x$, and the rollers and mandrel stopped. The lever $m^4$ is now operated to revolve the clutch $m'$ a half-revolution, whereby the knife descends and severs the web and raises the paste-roller off the end which belongs to the nearly-rolled tube, leaving sufficient paste thereon to finish it, and to engage the clutch $t$, by means of the V-shaped cam B, to revolve the rollers I J K to complete the tube by rolling the remaining end left between the mandrel and the knife, and to paste the edge thereof down upon the tube and thus finish it. The lever $g$ is now operated to raise the adjustable spring-roller I to remove the mandrel with its finished tube thereon. The lever $m^4$ is again operated to raise the knife and to carry the end of the web forward between the rollers to receive the mandrel thereon, when the several operations are repeated to roll the next tube, and so on.

In order that the paste-roller shall revolve with certainty to paste the web of paper drawn beneath it while it is being wound around the mandrel, intermediate gear-wheels 11 12, driven by a gear-wheel, 13, on the shaft of the upper flexible roller, E, are arranged as in Figs. 1, 8.

To the outer end of the shaft of the paste-roller H is fitted a pinion, 14, which engages with the gear-wheel 11 when in position to roll a tube, and when the paste-roller is raised off the web the pinion is raised therewith, and is out of gear; but when the paste-roller is again lowered upon the web the pinion again enters into gear with the wheel 11, and the paste-roller is revolved thereby with certainty while the web of paper is passing beneath it.

The driving-pulley 16, to impart motion to the rolling mechanism, is mounted upon a shaft secured to the side of the frame A. An intermediate gear-wheel, 17, is also secured to the same shaft, and which engages with the gear-wheel $x$ on the shaft of the adjustable spring-roller I.

The gear-wheel $x$ is loose on the shaft of the roller I, and revolves constantly with the belt-wheel 16, and only becomes a driving-wheel when engaged with the clutch $t$, mounted on the same shaft therewith, the spiral feather $b'$ serving as a key to the clutch $t$.

In the two applications for patents numbered, respectively, 27,088 and 27,089, in conformity to Rule 42 of "Official Practice," it is not intended to repeat the claims in either application, notwithstanding both contain similar elements for similar purposes. The claims in each case are designed to be separate and distinct.

Having thus fully described my invention, what I claim therein as new, and desire to secure by Letters Patent, is—

1. In a machine for rolling paper tubes, a pair of intermittently-rotating feed-rolls to present the end of the paper to the rolling mechanism, a series of winding-rollers arranged in the frame of the machine and in a vibrating frame, so as to be adjustable relatively to each other, and a mandrel between said rollers, upon which mandrel the tube is rolled, and a clutch operated by said vibrating frame to disconnect the driving mechanism of the machine, the whole combined and arranged substantially as shown, and so that the vibrating frame is lifted by the paper as it is wound upon the mandrel, and whereby the machine is stopped when the tube reaches the required thickness, substantially as described.

2. The combination of a pair of elastic feed-rolls to feed the paper to the winding mechanism, two segmental gears, as $J^2$ $J^4$, arranged to gear into each other, a clutch mechanism between the shaft of one of the segmental gears and a loosely-running wheel on said shaft, and a pawl-and-ratchet connection between said segmental gears and the elastic feed-rolls, substantially as described.

3. In a machine for rolling paper tubes, the combination of two segmental gears, such as $J^2$ $J^4$, arranged to gear into each other, the feed-rolls and pawl-and-ratchet connection, substantially as described, a clutch mechanism on the shaft of one of said segmental gears, $J^4$, through which intermittent motion is imparted to said gear, a reciprocating knife, and crank and connecting-rod between it and the shaft of the segmental gear $J^4$, whereby, through the operation of the clutch mechanism, the knife is caused to descend and sever the rolled tube from the web of paper, and afterward to rise and allow the end of the web to be fed forward to roll another tube.

4. A vertically-reciprocating paste-box, with a revolving roller at its bottom, in combination with a spring-catch to retain said box in its elevated position, mechanism, substantially as described, for raising said box and roller, and a vibrating frame or bar to operate the spring-catch to allow the box and roller to fall, substantially as herein described.

5. In a machine for rolling paper tubes, the combination of two or more supporting-rollers, a spring-pressure roller carried in a vibrating frame, a mandrel upon which the tube is rolled between the supporting and pressure rollers, a crank-shaft and self-adjusting spring connecting-rod for vibrating said frame, and a clutch, constructed substantially as herein set forth, by which the crank-shaft is revolved a half-revolution and stopped to either raise or lower the vibrating frame, as described.

6. In a machine for rolling paper tubes, the combination of two or more supporting-rollers, a pressure-roller carried in a vibrating frame, a mandrel upon which the tube is rolled between the supporting and pressure rollers, a crank-shaft and connecting-rod for vibrating the frame, and a sliding connection in said connecting-rod to allow the vibrating frame to rise independently of the crank-shaft.

7. In a machine for rolling paper tubes, the combination of two or more supporting-rollers arranged in the frame of the machine, a pressure-roller arranged in a vibrating frame, and a mandrel upon which the tube is rolled between the supporting and pressure rollers, a series of sliding fingers for starting the end of the web of paper around the mandrel, a crank-lever arranged to engage with the sliding fingers, and a connection between the vibrating frame and the crank-lever, substantially as described, whereby, as the frame is raised by the increasing thickness of the tube on the mandrel the fingers are withdrawn, substantially as herein set forth.

8. In a paper-tube machine, the combination of a vertically-adjustable paste-box provided at its bottom with a paste-roller, a vertically-reciprocating knife to sever the web of paper, said knife being operated by a crank-connection with the driving mechanism of the machine, a pivoted lever arranged between the knife and paste-box, and operating, substantially as shown, to raise the paste-box and its roller off the web of paper as the knife descends, and a spring-catch to retain said paste-box in an elevated position, substantially as herein set forth.

9. In a machine for rolling paper tubes, the combination of a series of winding-rollers, a pressure-roller carried by a vibrating frame and a mandrel upon which the tube is rolled between the winding and pressure rollers, a clutch mechanism on one of the winding-rollers, a forked pivoted lever for operating said clutch, and an arm or projection on the vibrating frame by which the lever is released to throw the clutch out of engagement and to stop the winding mechanism when the tube reaches the required thickness, substantially as set forth.

10. In a machine for rolling paper tubes, the combination of a series of winding-rollers connected by cog-wheels, through which motion is transmitted from one to the other, link-connections between the cog-wheels, by which an adjustment of the rollers relatively to each other is permitted without ungearing, a mandrel upon which the tube is rolled between said rollers, a series of sliding fingers by which the end of the web of paper is guided around the mandrel, a crank-lever adjustably mounted on a frame of the machine and engaging with the sliding-fingers, a vibrating frame or arm, and an adjustable connection between said frame and crank-lever, whereby the rolling mechanism may be adjusted to roll tubes of different sizes, substantially as set forth.

11. In a paper-tube machine, the combination of a series of winding-rollers, the elastic rollers, and a paste-box with a paste-roller at its bottom, said paste-box having an up and down movement to disconnect and connect with the intermediate gear between the elastic rollers and paste-roller, whereby, when the paste-box is raised, the paper may be fed forward to receive the mandrel without paste thereon and without revolving the paste-roller, and when the paste-box is lowered and the paper drawn between the elastic rollers and beneath the paste-roller positive motion is imparted to the paste-roller to distribute the paste, substantially as herein described.

12. In a paper-tube machine, the combination of a paste-box provided with a rotating paste-roller for distributing the paste on the passing web of paper, said paste-box having an up-and-down movement to rise off the web to permit its end to be moved forward by the flexible rollers to receive the mandrel thereon without being pasted, and an elastic roller to press the web up against the paste-roller, and a knife constructed and operated substantially as described, so that when the paste-roller is raised off the web the knife will simultaneously descend and sever the web to permit the tube to be completed.

DANIEL E. POWERS.

Witnesses:
H. WIDMAYER,
JAMES PATTON.